United States Patent
Frank et al.

(10) Patent No.: US 11,260,468 B2
(45) Date of Patent: Mar. 1, 2022

(54) REMOVABLE SCRIBE FRICTION STIR WELDING (FSW) TOOL

(71) Applicant: UNIVERSITY OF NORTH TEXAS, Dallas, TX (US)

(72) Inventors: Michael Frank, Dallas, TX (US); Tianhao Wang, Dallas, TX (US); Rajiv Mishra, Dallas, TX (US)

(73) Assignee: University of North Texas, Dallas, TX (US)

( * ) Notice: Subject to any disclaimer, the term of this patent is extended or adjusted under 35 U.S.C. 154(b) by 42 days.

(21) Appl. No.: 16/926,194

(22) Filed: Jul. 10, 2020

(65) Prior Publication Data
US 2021/0008658 A1 Jan. 14, 2021

Related U.S. Application Data

(60) Provisional application No. 62/873,622, filed on Jul. 12, 2019.

(51) Int. Cl.
*B23K 20/12* (2006.01)
*B23K 20/00* (2006.01)

(52) U.S. Cl.
CPC .......... *B23K 20/1255* (2013.01); *B23K 20/00* (2013.01); *B23K 20/125* (2013.01)

(58) Field of Classification Search
CPC ........ B23K 20/1255; B23K 20/26; B23C 5/22
See application file for complete search history.

(56) References Cited

U.S. PATENT DOCUMENTS

| | | | | |
|---|---|---|---|---|
| 5,794,835 A * | 8/1998 | Colligan | ................... | B23C 5/22 228/2.1 |
| 8,910,851 B2 * | 12/2014 | Rosal | ................. | B23K 20/1255 228/112.1 |
| 10,661,379 B1 * | 5/2020 | Larsson | ................. | B23K 37/08 |
| 11,059,125 B2 * | 7/2021 | Rosal | ................. | B23K 20/1255 |
| 2006/0049234 A1 * | 3/2006 | Flak | .................... | B23K 20/1225 228/112.1 |
| 2009/0236045 A1 * | 9/2009 | Burton | ............... | B23K 20/1265 156/349 |
| 2010/0038832 A1 * | 2/2010 | Rosal | ................. | B23K 20/1255 266/46 |
| 2011/0101071 A1 * | 5/2011 | Kato | ................... | B23K 20/1265 228/2.1 |
| 2011/0309131 A1 * | 12/2011 | Hovanski | ........... | B23K 20/1255 228/124.1 |
| 2013/0206818 A1 * | 8/2013 | Higgins | ............... | B23K 20/128 228/114 |
| 2019/0344380 A1 * | 11/2019 | Miles | ................... | B23K 20/124 |

* cited by examiner

*Primary Examiner* — Erin B Saad
(74) *Attorney, Agent, or Firm* — Andrew M. Metrailer; Conley Rose, P.C.

(57) ABSTRACT

A friction stir welding tool comprises a cylindrical shank, a shoulder portion disposed at a distal end of the shank, a pin extending from the shoulder, a cutting insert mounted within a concave portion at the distal end of the shank, and a scribe cutter mounted at a distal end of the cutting insert. The cutting insert extends distally through a channel in the pine, and the scribe cutter extends from a distal end surface of the pin in an offset position. The distal end surface of the pin is perpendicular to a longitudinal axis of the shank.

20 Claims, 17 Drawing Sheets

Prior art - fixed, non-replaceable, non-indexable scribe

Stress > Transverse rupture strength → Scribe fracture

Types of joints

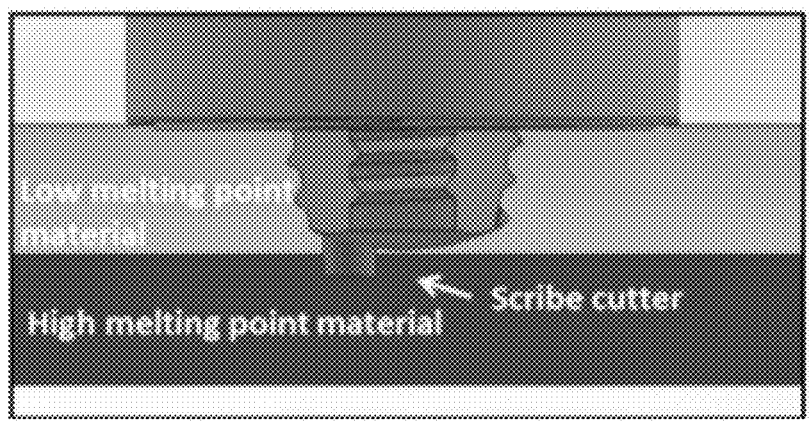
FIGURE 10A
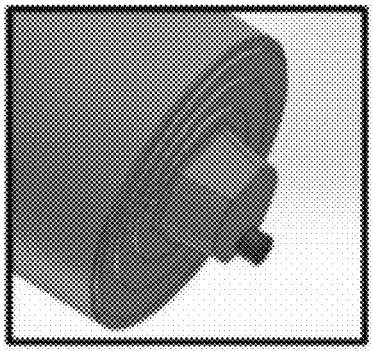
FIGURE 10B
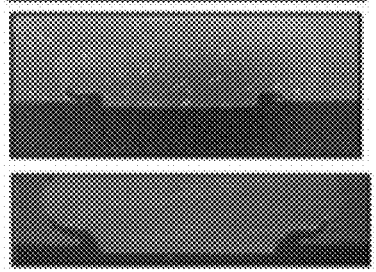
FIGURE 10C
FIGURE 10D

REMOVABLE SCRIBE FRICTION STIR WELDING (FSW) TOOL

CROSS-REFERENCE TO RELATED APPLICATIONS

This application claims the benefit of U.S. Provisional Application No. 62/873,622 filed on Jul. 12, 2019 and entitled "Removable Scribe Friction Stir Welding (FSW) Tool," which is incorporated herein by reference in its entirety for all purposes.

STATEMENT REGARDING GOVERNMENTALLY SPONSORED RESEARCH OR DEVELOPMENT

This invention was made with Government support under Grant (or Contract) No. W911NF-15-2-0026, awarded by the Department of Defense. The Government has certain rights in this invention.

BACKGROUND

In a joining process called friction stir welding (FSW), a rotating tool is plunged into the interface between two materials to be joined to generate friction between the tool and work piece, and thus heat. FSW is a process for joining metals without fusion or filler materials. FSW is used routinely for joining components made of aluminum, magnesium and their various alloys. The process results in strong and ductile joints, sometimes in systems which have proved difficult using conventional welding techniques. The process is most suitable for components which are flat and long (plates and sheets) but can be adapted for pipes, hollow sections and positional welding. The welds are created by the combined action of frictional heating and mechanical deformation due to a rotating tool.

In conventional friction stir welding, in which two identical metals or alloys are joined, heat is generated due to tool-work piece friction and also deformation. As a result of heat generation the work piece materials are softened, but not melted, and intermixing by the rotating tool forms a welded joint. This solid-phase joining can also be performed on dissimilar material combinations. In the case of two stacked or adjacent pieces of dissimilar materials with different melting points, brittle intermetallic phases form at the interface of the joined materials. Importantly, thicker intermetallic compound layers have shown to be detrimental to the mechanical properties dissimilar joints.

SUMMARY

In an aspect, a method for forming a weld between at least two dissimilar materials using a friction stir welding tool comprises providing the friction stir welding tool. The friction stir welding tool comprises a cylindrical shank, a shoulder portion disposed at a distal end of the shank, a pin extending from the shoulder, and a cutting insert mounted within a concave portion at the distal end of the shank. The cutting insert extends distally through a channel in the pin/probe, and a scribe cutter is mounted at a distal end of the cutting insert and extending from a terminal end surface of the pin in an offset position. The terminal end surface of the pin is perpendicular to a longitudinal axis of the shank. The method also comprises positioning at least two dissimilar materials in a weld stack with an overlap therebetween, rotating the friction stir welding tool, penetrating the first material of the weld stack to a preselected depth with the pin and the scribe cutter, cutting, with the scribe cutter, a surface of the second material to introduce a plurality of features therein along the weld interface, backfilling the plurality of features with extruded first material, and forming mechanically interlocking features along the weld interface to form a weld between the dissimilar materials. The at least two dissimilar materials comprise a first material and a second material, and the overlap defines the weld interface of the at least two dissimilar materials being joined. The pin and the scribe cutter penetrating into the first material and the scribe cutter penetrate the second material.

In some aspects, a friction stir welding tool comprises a cylindrical shank, a shoulder portion disposed at a distal end of the shank, a pin extending from the shoulder, a cutting insert mounted within a concave portion at the distal end of the shank, and a scribe cutter mounted at a distal end of the cutting insert. The cutting insert extends distally through a channel in the pine, and the scribe cutter extends from a distal end surface of the pin in an offset position. The distal end surface of the pin is perpendicular to a longitudinal axis of the shank.

These and other features will be more clearly understood from the following detailed description taken in conjunction with the accompanying claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIGS. 10A-10D are illustrations of a series of images showing a tool inserted into a softer material to access a harder material to form the molten weld composite, a close-up of a probe and scribe device, and a pair of cross-sectional representations of the structural details of a completed weld structure.

DETAILED DESCRIPTION

Figure 1:
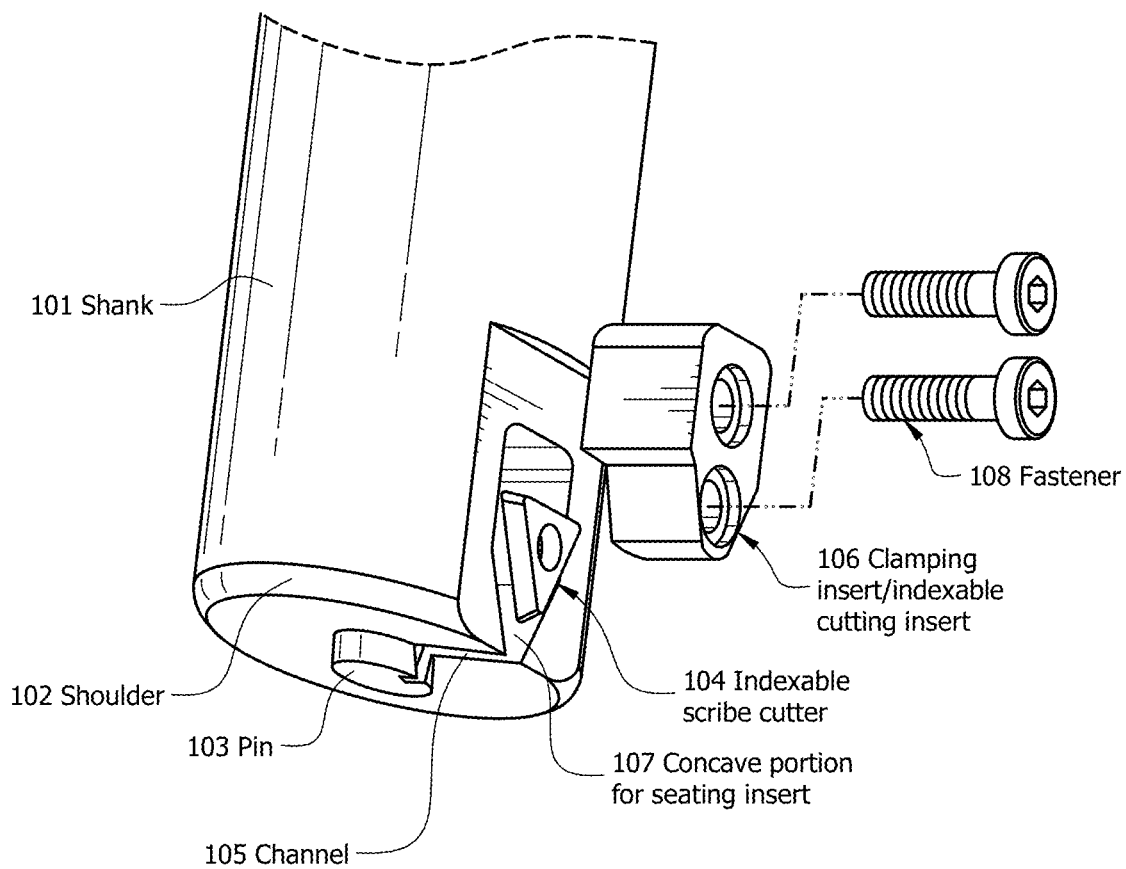
FIG. 1 is an illustration of an exploded view of an embodiment and shows a friction stir welding probe having a tool body with an indexable cutting insert mounted in the tool body using a clamping insert and a fastener assembly.

The embodiments disclosed herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Disclosed herein is a technology involving a removable and replaceable scribe (an indexable cutting insert) extending from a friction stir welding tool. The indexable cutting inserts can be fixed to the tool body via mechanical clamping insert and fastener (as described herein). The tool body and mechanical clamping insert can be formed from H13 tool steel. The fasteners can be formed from grade 2 steel and black oxide steel, and the indexable cutters can have various coating such as super micro-grain cermet-TiAlN+TiN.

The disclosed method can be used not only for lap welding (where the materials are stacked on top of one another), but also for butt welding (where the materials are laid adjacent to one another). As described herein, having a replaceable scribe with proper choice in scribe material and coating material, thus allowing proper mechanical interlocking from the high temperature material to the low temperature material. This then helps to prevent any further defects in joining the materials and allows for replacement of the scribe as needed.

The disclosed tool can be used as a friction stir welding tool which encompasses the use of a removable, and thus substitutable for various strengths of material, indexable cutting inserts. The indexable inserts can be mechanically fixed to the tool, in the pin, the shoulder or between the two. The insert serves as a cutting tool in various configurations of dissimilar material welding. Welding process parameters such as rotational rate, plunge depth and traverse speed allow the insert a means to both prepare the surface of the high melting point material for metallurgical bonding and manipulate the diffusion-controlled process of forming the intermetallic compound layer.

Intermetallic compound layers can be formed when friction stir welding is used for dissimilar materials. One approach to reducing the thickness of the intermetallic layer has been to impose asymmetric interactions between the two dissimilar materials, using tool offset and/or a scribe cutter. In the case of the latter, a component of the rotating tool is the attached scribe. The scribe (cutter) penetrates and deforms the high melting point material (e.g., higher strength at welding temperature) to further ensure the interlocking between the two materials. A common issue that arises with scribes is that they may fracture when encountering higher strength materials even though the scribe can be made of high strength materials such as WC—Co. The scribe experiences multi-directional forces, both an axial forging force and a rotational force that may lead to its failure. Once a scribe fails, the friction stir welding tool is no longer useable. Having to replace the entire tool is not only expensive but can provide inconsistent welds, specifically a decrease in penetration depth of the scribe after fracture, if failure occurs in the middle of a welding process.

The systems and methods disclosed herein include a weld forming tool and process of a friction stir weld (FSW) design that generates welds between similar or dissimilar materials with enhanced joint strengths. As used herein, the term "dissimilar" in reference to weld component materials being joined means: "a difference in melting (temperature) point of more than about 20%, or a difference in density of at least about 10% by mass. The weld forming tool and processes of the present disclosure overcome the problems with welding dissimilar materials and generating a weld that binds the dissimilar materials (e.g., aluminum to steel) together.

The weld forming tool includes a scribe cutter detailed further herein that introduces features into the surface of the second material (e.g., the component having the higher melting temperature or higher density) (e.g., steel), which is placed generally adjacent to a first material (e.g., the component having the lower melting temperature or lower density) (e.g., aluminum). A region of overlap is established between the dissimilar materials as a weld interface between the components being joined together, and the rotation of the tool introduces mechanical interlocking features into the surface of the second material component that can be backfilled with the first material that is melted/extruded by the scribe cutter and delivered by the weld forming tool.

The filled interlocking features enhance the shear strength of the welds that are formed. As such, the disclosed process provides weld joints between dissimilar materials that appear to be bonded both chemically and mechanically and exhibit less susceptibility to variations in sheet thickness and surface conditions of the selected dissimilar materials.

The disclosed tool and processes address technical problems related to friction stir welding. In particular, one problem is scribe fracture upon encountering higher strength materials. This is a result of large loads being imposed on the scribe during welding. During rotation and deformation of high strength materials, the interface of the scribe/pin with the higher strength material is high stress concentration location. The scribe cutter does not have a designed cutting edge to ease the cutting event, which leads to larger stresses on the scribe. Scribe failure occurs when the strength of the cutter is exceeded, as a result of multi-directional loading during the plunging or traversing stages of the welding process.

When the scribe fails, the tool is deemed useless as the tool cannot penetrate to the intended depth or deform the high temperature material. In addition, the method for manufacturing the current technology is difficult, and can be inconsistent. Press fitting risks not fully seating the scribe, ending in a scribe length which could change in process or fracture, and also the difficulty of pressing the scribe (for example made of WC—Co) into tool steel with interference and avoiding scribe fracture.

As stated, the disclosed tool and processes comprise a friction stir welding tool which encompasses the use of a removable, and thus substitutable, indexable cutting inserts. The indexable inserts are mechanically fixed to the tool, within or on the surface of the clamping insert, in the pin, the shoulder, or between the two. The insert serves as a cutting tool in various configurations of dissimilar welding. Welding process parameters such as rotational rate, plunge depth, and traverse speed allow the insert a means to manipulate the diffusion-controlled process of forming the intermetallic compound layer.

Design benefits of the tool and processes disclosed herein include: (i) a replaceable cutter, (ii) relatively more convenient manufacturing methods, (iii) the ability to weld materials, where the second material has higher: hardness, and/or shear strength, and/or ultimate tensile strength, and (iv) the use of various insert geometries designed with cutting edges used for conventional material removal processes for various work piece materials. The benefits relative to prior indexable cutters include: (v) low cost, (vi) commercially available, (vii) convenient fastening, (viii) multiple cutting edges per insert, (ix) the ability to be paired with CW and CCW tooling, (x) an extensive selection of different insert substrate and coating material properties such as Transverse Rupture Strength, Fracture Toughness, Hardness, Oxidation Resistance, and Temperature Resistance, and (xi) The scribe reaches a range that will be higher than the tool body because it will contact the second material (e.g., steel).

In some aspects, the tool includes where there may be one or more removable cutters, with one or more cutting edges which protrude from the tool assembly contacting the intended work piece material.

In another non-limiting embodiment, the tool includes where the removable cutter may be uncoated or has one or more coatings with a substrate composed of a cermet, metal or a combination of the two material types.

In another non-limiting embodiment, the tool includes where the removable cutter, or cutters, is brazed, mechanically fastened, or attached to or within the welding tool.

A friction stir welding tool which encompasses the use of a removable, and thus substitutable, commercially available indexable cutting inserts is proposed. The indexable inserts are mechanically fixed to the tool, in the pin, the shoulder, or between the two. The insert serves as a cutting tool in various configurations of dissimilar welding. Welding process parameters such as rotational rate, plunge depth and traverse speed allow the insert a means to manipulate the diffusion-controlled process of forming the intermetallic compound layer.

A method for manufacturing a friction stir welding tool for dissimilar welding encompasses: a pin, a shoulder, a component for mechanical fixation, and a tool manufactured for a material removal process. The tool body containing a shoulder, pin, a cavity, a cutter and mechanical clamping.

In the manufacturing method, a tool body is comprised of shaft that can be manufactured to have a shoulder and a pin and is made of a material such as steel, a steel alloy, tungsten, and/or an alloy which encompasses refractory metals. The tool body has a cavity where material has been removed to allow for the placement of a tool manufactured for a material removal process, or cutter. Within the cavity, contact surfaces are placed to enable fixation to the tool body. A contact surface offset from the centerline of the tool and a contact surface perpendicular to the centerline of the cylindrical tool body. An insert may be included in the assembly to assist in fixing the tool and may provide an additional contact surface with the cutter. Both the cavity and insert may contain threaded holes to assist in mechanically fixing the cutter, which may also have a through hole to aid in fixation. A cutting insert may be mounted to the mechanical insert, prior to the mechanical insert being mounted to the tool body. A mechanical insert may or may not be included in the cavity geometry, which can be dependent upon the geometry of the selected tool manufactured for a material removal process. The cavity surface contains angles, radii, or similar geometric features such as clearance angles, relief angles and nose radii, which conform to the geometry of the selected tool manufactured for a material removal process which aid in a secure fixation of the cutter.

This method of fixing the cutter with mechanical clamping, as described in the manufacturing method, allows for the tool manufactured for a material removal process, to be removed and replaced with another cutter of similar geometry. Different cutter materials are currently manufactured to promote different interactions with the workpiece material and can promote ideal surface preparation for bonding in dissimilar friction stir welding. This allows for the extensive supply of commercially available cutters with varying properties to be fixed to the tool body. The selection of various cutters enables change in cutter properties in order to promote wear resistance, reduced friction force during cutting, temperature resistance, reduced reactivity with atmosphere and work piece materials (e.g., oxidation, etc.), and properties alike. These properties can be selected based upon work piece materials and can be used to optimize tool life, material sticking and slipping conditions with the cutter, and avoidance of cutter fracture due to stress at high temperature.

This method of fixing the cutter with mechanical clamping, as described in the manufacturing method, allows for the tool manufactured for a material removal process, if indexable, to be removed and fixed with the adjacent cutting edge exposed and also for reuse of the tool body and mechanical clamp with a new cutter. Accordingly in dissimilar friction stir welding each cutting edge can be used to make a joint between dissimilar materials. The use of multiple cutting edges can considerably reduce the cost by extending the usage of the friction stir welding tool which is comprised of an indexable cutter. In addition, the cutter may be fixed with the tool body, where the tool body, made of steel, provides support in regards to toughness, to resist shear fracture of cutter. The contact surface on the tool body is a plane offset from its centerline to a selected distance based on the cutter geometry to allow for rigid clamping. This surface provides structural support of the cutter in regions which do not contain a cutting edge. One tool can hold different cutters of different composition (coating, substrate, etc), for example it can be used to cut mild steel, high strength steel or titanium, with various cutter which are declared by the manufacture to assist cutting.

As shown in FIG. 1, a friction stir welding probe or tool can have a shank 101 with a shoulder 102 and a pin or probe 103. The shank 101 can be an elongated cylindrical shank, and the shoulder 102 can be a shoulder portion disposed at the distal end of the shank 101. The probe or pin 103 can extend from the shoulder 102.

The indexable scribe cutter 104 (e.g., an indexable cutting insert, etc.) can be mounted within the concave portion 107 of the shank 101 and retained in position by an indexable cutting insert 106 that is mounted within the concave portion 107 at the distal end of in the tool body or shank 101. The scribe 104 can extends through the channel 105 to contact the workpiece. Concave portion 107 of the shank 101 can be used for seating the indexable cutting insert 106. Fastener assembly 108 can attach the indexable insert 106 to the shank body 101. The indexable scribe cutter 104 can be mounted at a distal end of the indexable cutting insert 106 and extend from a terminal end surface of the pin/probe 103 in an offset position, where the terminal end surface of the pin/probe 103 is perpendicular to the longitudinal direction of the shank 101 of the tool.

The tool can be formed from various materials. In some aspects, the shank 101, pin/probe 103, and indexable cutting insert 106 can be formed from the same materials, such as H13 tool steel. The indexable scribe cutter 104 can be made from a material that is harder than the material of the shank 101, pin/probe 103, and/or indexable cutting insert 106. In some aspects, the indexable scribe cutter 104 can be made from a material comprising tungsten carbide, nickel, titanium, tungsten, steel, carbide steel, polycrystalline cubic boron nitride, polycrystalline diamond, silicon nitride, rhenium, boron, or any combination thereof.

The indexable scribe cutter 104 can extend from a terminal end surface of the pin 103. In some aspects, the indexable scribe cutter 104 can extend a distance outwards from the surface of the pin 103 a distance of less than or equal to 50% of the pin's 103 thickness (e.g., a distance the pin 103 extends from the distal end of the shank 101 or shoulder 102). For example, the indexable scribe cutter 104 can extends a distance below the surface of the pin 103 a distance in the range from about 0.1 mm to about 3.0 mm. In some aspects, the indexable scribe cutter 104 can extend outwards from a side of the pin 103 (e.g., in a direction perpendicular to the longitudinal axis of the shank 101) by a similar amount.

The indexable scribe cutter 104 can be mounted such that the indexable scribe cutter 104 is offset from a center of the pin 103. In some aspects, the indexable scribe cutter 104 can include a radial offset position that can be a distance of at least about one quarter of the diameter of the base of the pin 103 as measured from the center of the pin 103. For example, the indexable scribe cutter 104 can be positioned between about one quarter of the diameter of the base of the pin and an outer edge of the pin 103. The indexable scribe cutter 104 can have various cutting geometries designed to shear the workpiece material. The shape of the indexable scribe cutter 104 and/or a portion of the indexable scribe cutter 104 extending beyond a surface of the pin 103 can include, but is not limited to, an inverted cone, an inverted cuboid, a cylinder, an inverted squared pyramid, an inverted triangular pyramid, an inverted triangular prism, an inverted diamond, and/or an irregular polyhedron.

The indexable scribe cutter 104 can be coupled to the tool in a number of ways. In some aspects, the indexable scribe cutter 104 can be mechanically fixed to the shank 101, the indexable cutting insert 106, in the pin 103, to the shoulder 102, or between two of the components (e.g., between the indexable cutting insert 106 and the shank 101/shoulder 102, etc.). In some aspects, the indexable scribe cutter 104 can be brazed, mechanically fastened, or attached to the indexable cutting insert.

While shown as having a single indexable scribe cutter 104, two or more indexable scribe cutters 104 can also be used. For example, the indexable cutting insert 106 can be configured to mount two or more indexable scribe cutters 104 such that the cutting edges of the two or more indexable scribe cutters can contact the intended workpiece material. For example, two indexable scribe cutters can be positioned in offset positions about the distal end or outer surface of the pin 103 such that the plurality of cutting surfaces can contact the workpiece(s) during use.

Figure 2:
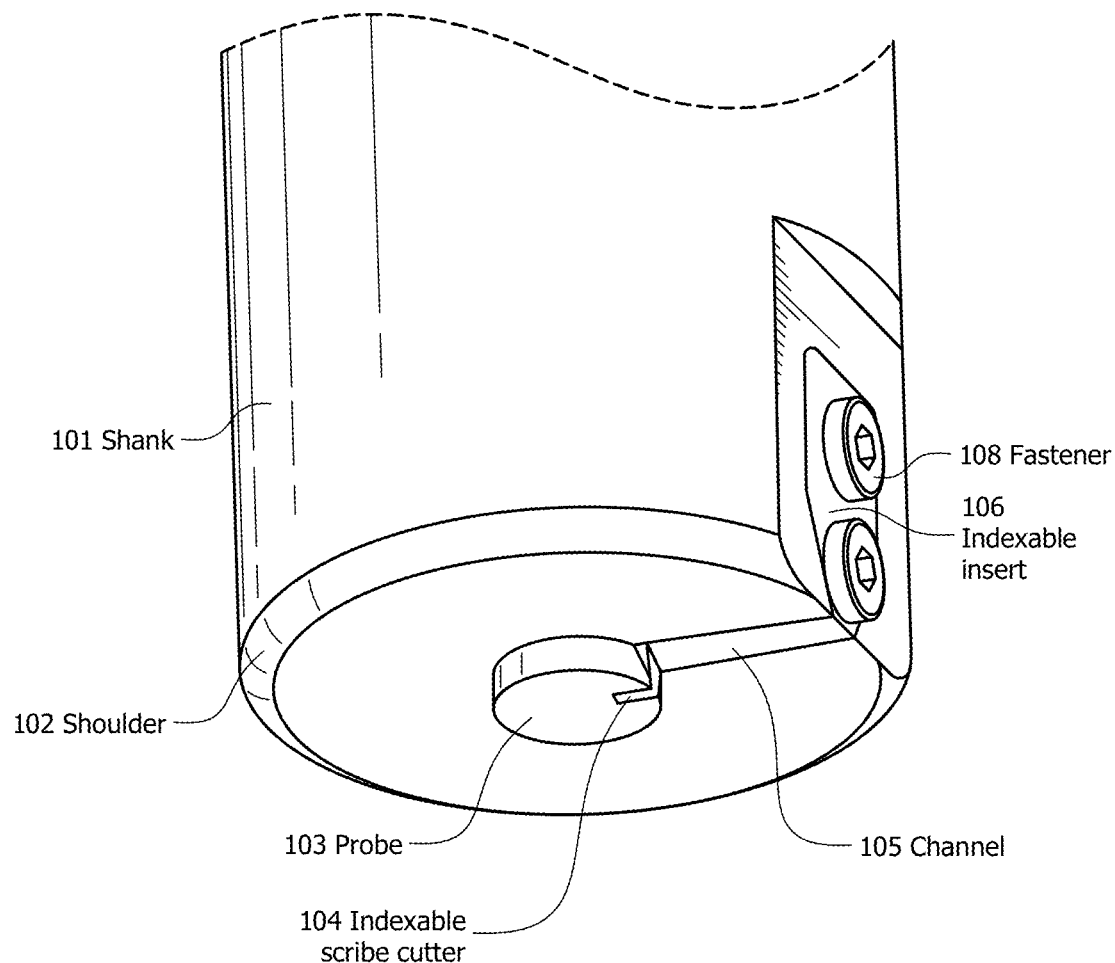
FIG. 2 is an illustration of an assembled view of an embodiment and shows a friction stir welding probe having a tool body with an indexable cutting insert mounted in the tool body using a clamping insert and a fastener assembly.

FIG. 2 is an illustration of an assembled view of one embodiment of the tool and shows friction stir welding probe having a shank 101 with a shoulder 102 and pin or probe 103.

The indexable scribe cutter 104 is mounted within the indexable cutting insert 106 in the tool body and the scribe extends through channel 105 to contact the workpiece. Concave portion 107 of the shank 101 is used for seating the indexable cutting insert 106. Fastener assembly 108 attaches the indexable insert 106 to the shank body 101 and retains the indexable insert 106 in position during use.

In use, a method for forming a weld between at least two dissimilar materials can include a friction stir welding tool as described herein. For example, the tool as described with respect to FIG. 1 and/or FIG. 2 (or any of the other embodiments described herein) can be used to form a weld between at least two dissimilar materials. The method can begin with providing or using a friction stir welding tool as described herein. For example, the friction stir welding tool can comprise an elongated cylindrical shank 101, a shoulder portion 102 disposed at a distal end of the shank 101, a pin/probe 103 extending from the shoulder 102, an indexable cutting insert 106 mounted within a concave portion 107 at the distal end of the shank 101, said indexable cutting insert 106 extends distally through a channel in the pin/probe 103, and an indexable scribe cutter 104 can be mounted at a distal end of the indexable cutting insert 106 and extend from a terminal end surface of the pin/probe 103 in an offset position, where the terminal end surface of the pin/probe 103 can be perpendicular to the longitudinal direction of the shank 101 and/or tool.

The shank 101, pin/probe 103, and/or indexable cutting insert 106 can comprise alloys and/or cermet materials. In some aspects, the shank 101, pin/probe 103, and/or indexable cutting insert 106 can comprise H13 tool steel. The indexable cutting insert 106 can be mounted to the concave portion 107 and/or the tool body or shank 101 using mechanical fasteners. The mechanical fasteners 108 can be made from grade 2 steel or black oxide steel.

The indexable scribe cutter 104 can be made from super micro-grain cermet with a TiAlN+TiN coating material in some aspects. In other aspects, the indexable scribe cutter 104 can be made from tungsten carbide, nickel, titanium, tungsten, steel, carbide steel, polycrystalline cubic boron nitride, polycrystalline diamond, silicon nitride, rhenium, boron, or any combination(s) thereof. The indexable scribe cutter 104 can be formed using any of the shapes or positioning described herein.

The indexable scribe cutter 104 can have a taper angle greater than or equal to about 90 degrees. In some aspects, the indexable scribe cutter 104 can be angled at between 0 and 90 degrees with respect to the vertical direction (e.g., a direction parallel to the longitudinal axis of the shank 101).

Once the tool is provided or used, the method can comprise positioning dissimilar materials comprising a first material and a second material in a weld stack with an overlap or abutment therebetween, which can be used to define a weld interface of the materials being joined. The first material can be a metal selected from aluminum, magnesium, titanium, or alloys thereof, and the second material can have a greater melting temperature than the first material. For example, the second material can be steel, titanium, or alloys thereof (e.g., alloys of similar melting temperature(s)), or steel alloy. In some aspects, the first material can be a metal/alloy and/or a polymer, and the second material can be metal/alloy. For example, the first material can be a metal/alloy and/or a polymer, and the second material can be steel or steel alloy.

The first material and the second material can be dissimilar materials. In some aspects, the first material and second material can have melting temperatures that are different from each other by at least about 20%. The first material and second material can have densities that are different from each other by at least about 10%.

Once the dissimilar materials are positioned, the friction stir welding tool can be rotated to penetrate the first material of the weld stack to a preselected depth with the pin 103 and the indexable scribe cutter 104. The pin 103 and indexable scribe cutter 104 can penetrate into the first material, and the indexable scribe cutter 104 can penetrate the second material. The indexable scribe cutter 104 can generate a weld interface of a width that is at least about two times the offset distance of the indexable scribe cutter 104. During use, the indexable scribe cutter can have a rotational velocity of between about 100 rpm and 10003000 rpm.

As a result of the rotation and penetration, the indexable scribe cutter 104 can cut a surface of the second material to introduce a plurality of features therein along the weld interface. The resulting features can be backfilled with extruded first material, thereby forming mechanically interlocking features along the weld interface that yield a weld with an enhanced shear strength between the dissimilar materials.

Figure 3:
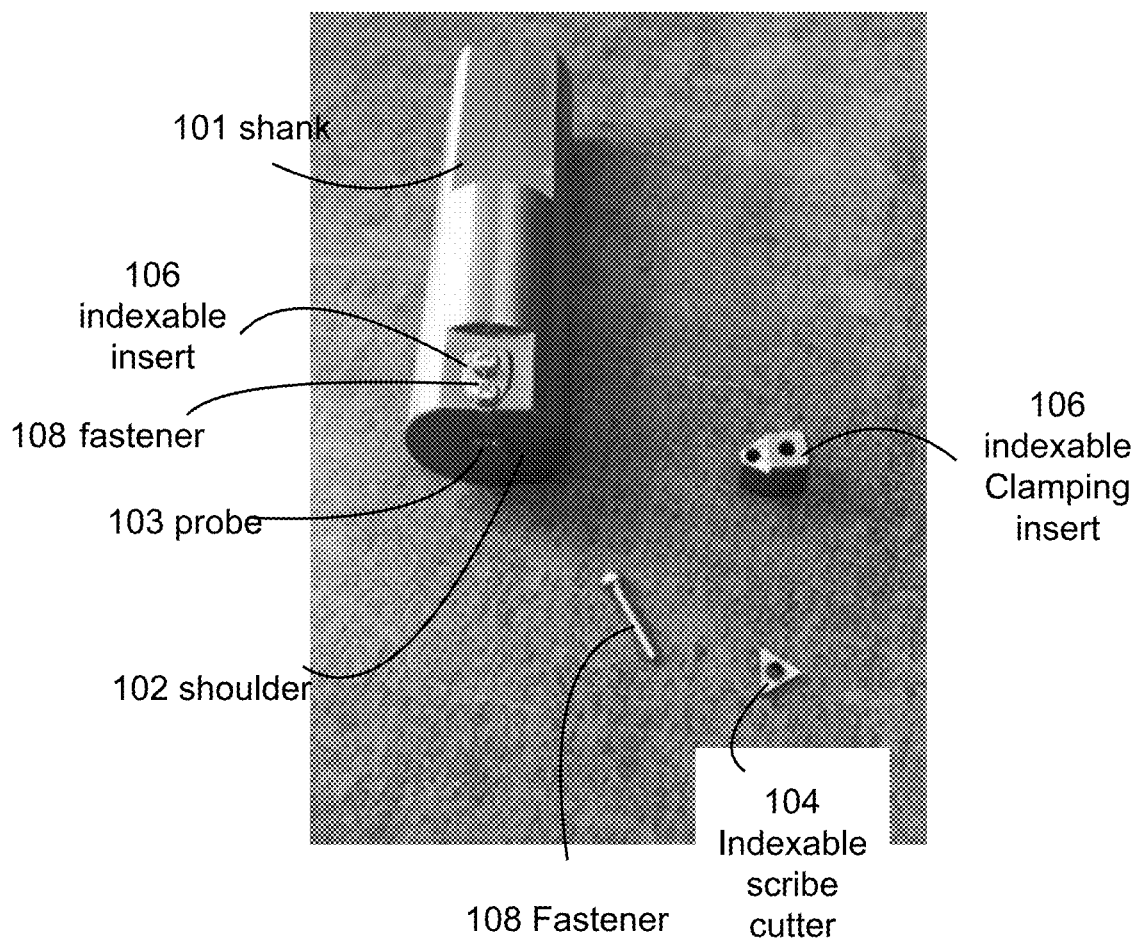
FIG. 3 is a photographic representation of an assembled view of an embodiment and shows a friction stir welding probe having a tool body with an indexable cutting insert mounted in the tool body using a clamping insert and a fastener assembly. An extra fastener, indexable cutting insert, and clamping insert are shown next to the assembled device.

FIG. 3 is a photographic representation of an assembled view of one embodiment of the tool and friction stir welding probe having a shank 101 with a shoulder 102 and pin or probe 103. The indexable scribe cutter 104 is mounted within the indexable cutting insert 106 in the tool body and the scribe extends through channel 105 to contact the workpiece. Concave portion 107 of the shank 101 is used for seating the indexable cutting insert 106. Fastener assembly 108 attaches the indexable insert 106 to the shank body 101. An extra fastener, indexable cutting insert, and clamping insert are shown next to the assembled device for reference.

Figure 4A:
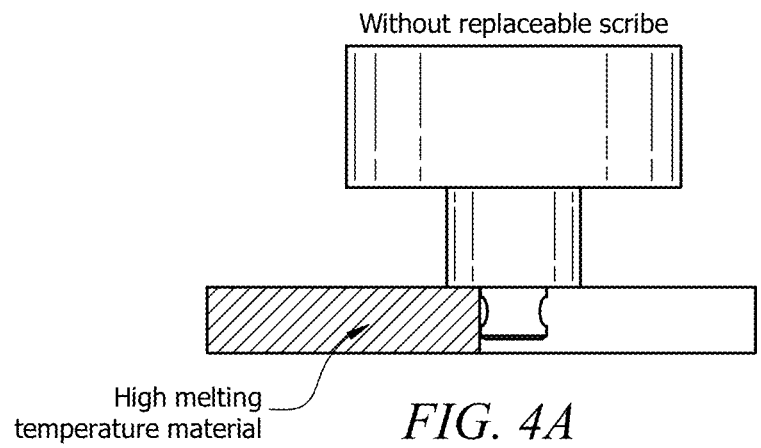
FIG. 4A is an illustration of a cross-sectional view of a prior art tool.
Figure 4B:
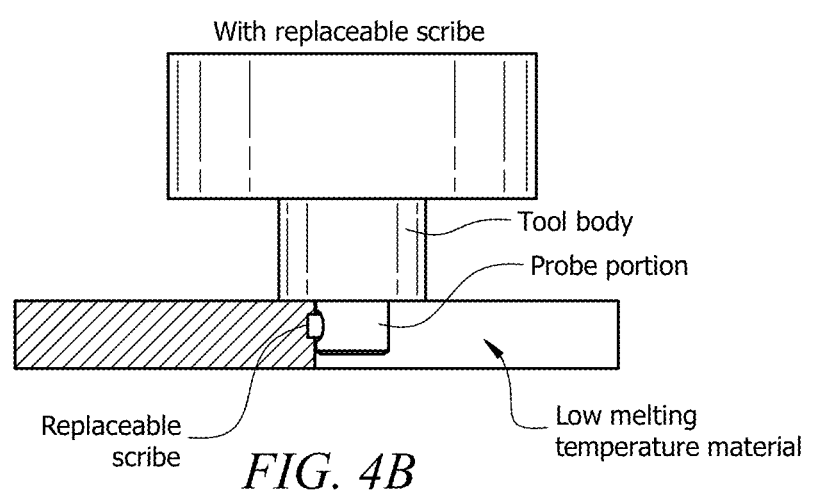
FIG. 4B is an illustration of a cross-sectional view of an embodiment of a tool with a removable scribe friction stir welding tool.

FIGS. 4A and 4B are illustrations of cross-sectional views of a comparison of a prior art tool in FIG. 4A with a removable scribe friction stir welding tool in FIG. 4B. As illustrated, the scribe can extend into the higher melting temperature material in some embodiments disclosed herein. This can create features in the higher melting temperature material that can improve the bonding with the lower melting temperature material. As shown in FIG. 4A, the tool may not extend into the higher melting temperature material, which can result in a bond having a lower bond strength and/or a bond that may be subject to failure.

Figure 5A:
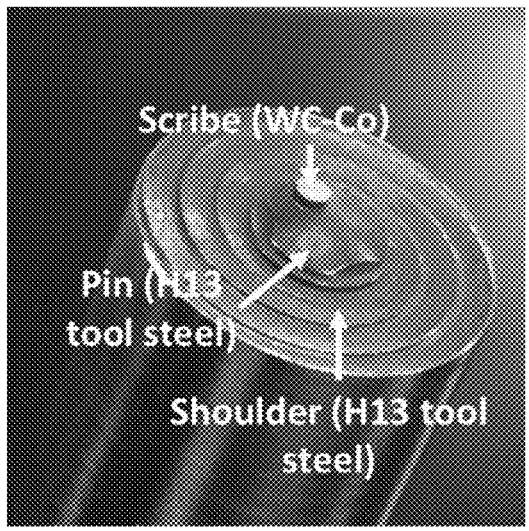
FIG. 5A is a photographic representation of a fixed scribe device.
Figure 5B:
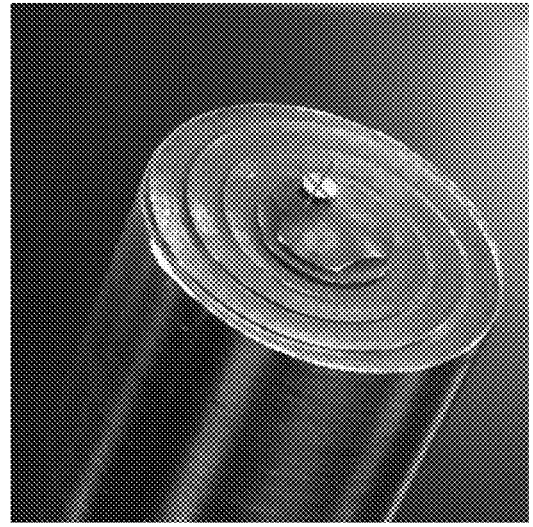
FIG. 5B is another photographic representation of a fixed scribe device.

FIGS. 5A and 5B are photographic representations of a fixed scribe device. If the scribe as shown in FIGS. 5A and 5B fails, the entire tool must be replaced.

Figure 6A:
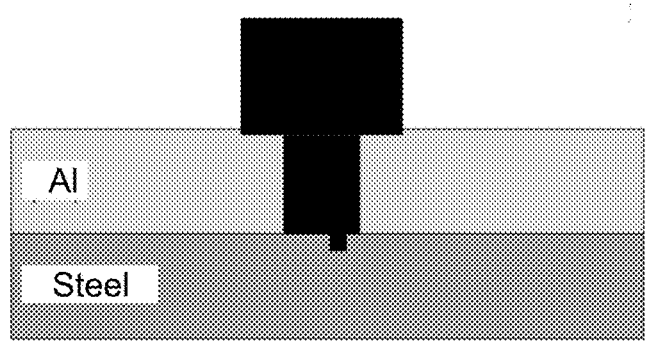
FIG. 6A is an illustration of a tool inserted into a softer material to access a harder material to form the molten weld composite.
Figure 6B:
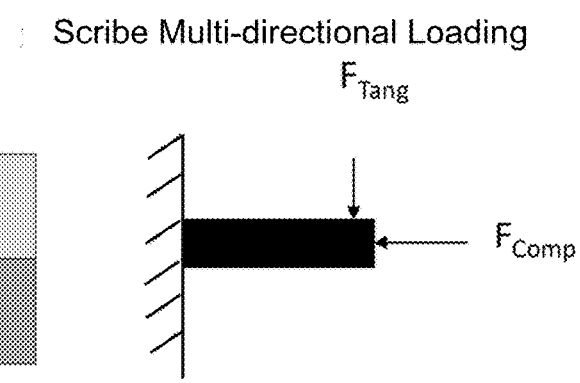
FIG. 6B is an illustration of an embodiment of the forces present on the cutting insert during use.
Figure 7A:
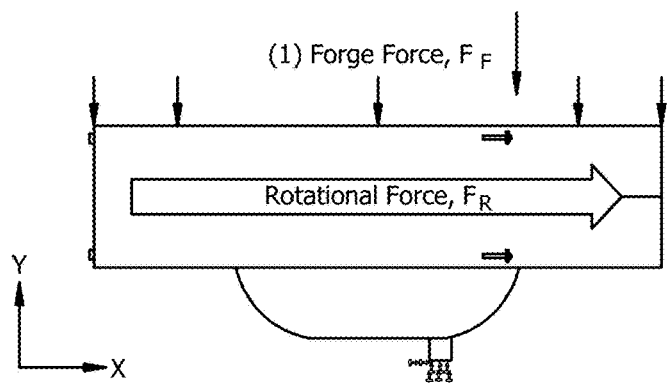
FIGS. 7A-7D are illustrations showing a side view of rotational force versus forge force, a top view of forces on the scribe cutter in the X and Y planes, a perspective view of forces on the scribe cutter in the Z plane, and a stress illustration showing the location on the scribe of stress forces from high to low.
Figure 7B:
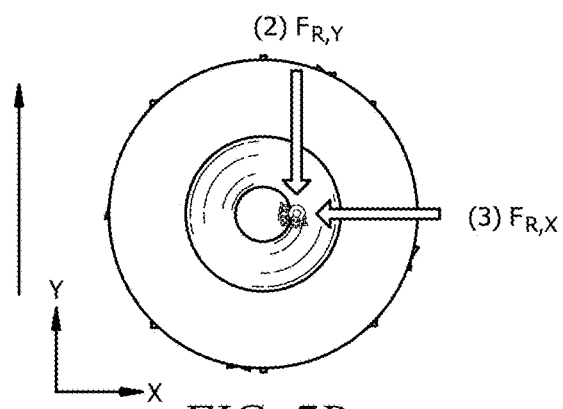
Figure 7C:
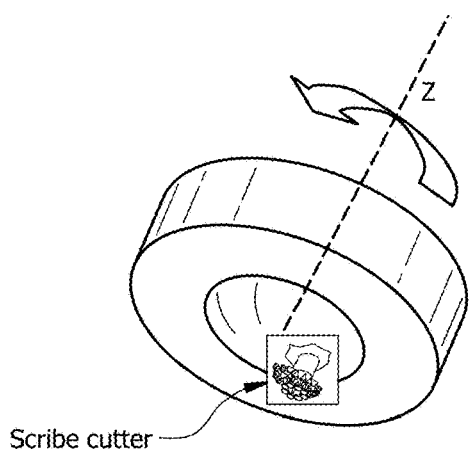
Figure 7D:
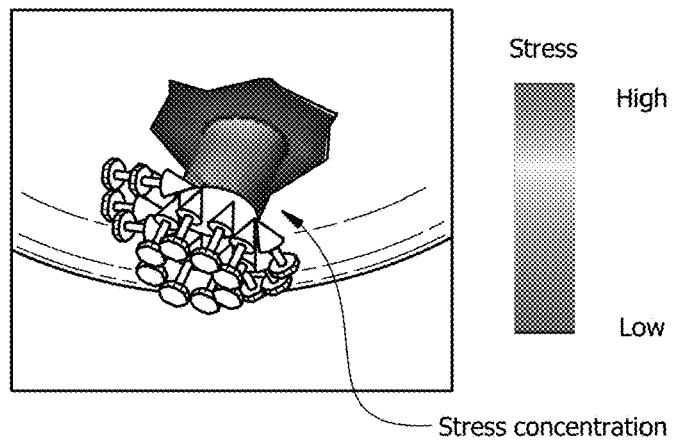

FIG. 6A is an illustration of a tool inserted into a softer material to access a harder material to form the molten weld composite. As illustrated, the upper layer may comprise a softer material as compared to the material in the lower layer. FIG. 6A shows how the tool can be used to bore through the softer material so that the scribe tip can access and deform the harder material. FIG. 6B shows multi-directional loading forces on the scribe, F-tang and F comp. F-tang represents tangential forces on the scribe during the welding process. F-comp represents compressive forces created by pressing the tool and scribe into the materials being joined.

FIGS. 7A-7D are illustrations showing a side view of rotational force versus forge force, a top view of forces on the scribe cutter in the X and Y planes, a perspective view of forces on the scribe cutter in the Z plane, and a stress illustration showing the location on the scribe of stress forces from high to low.

Figure 8:
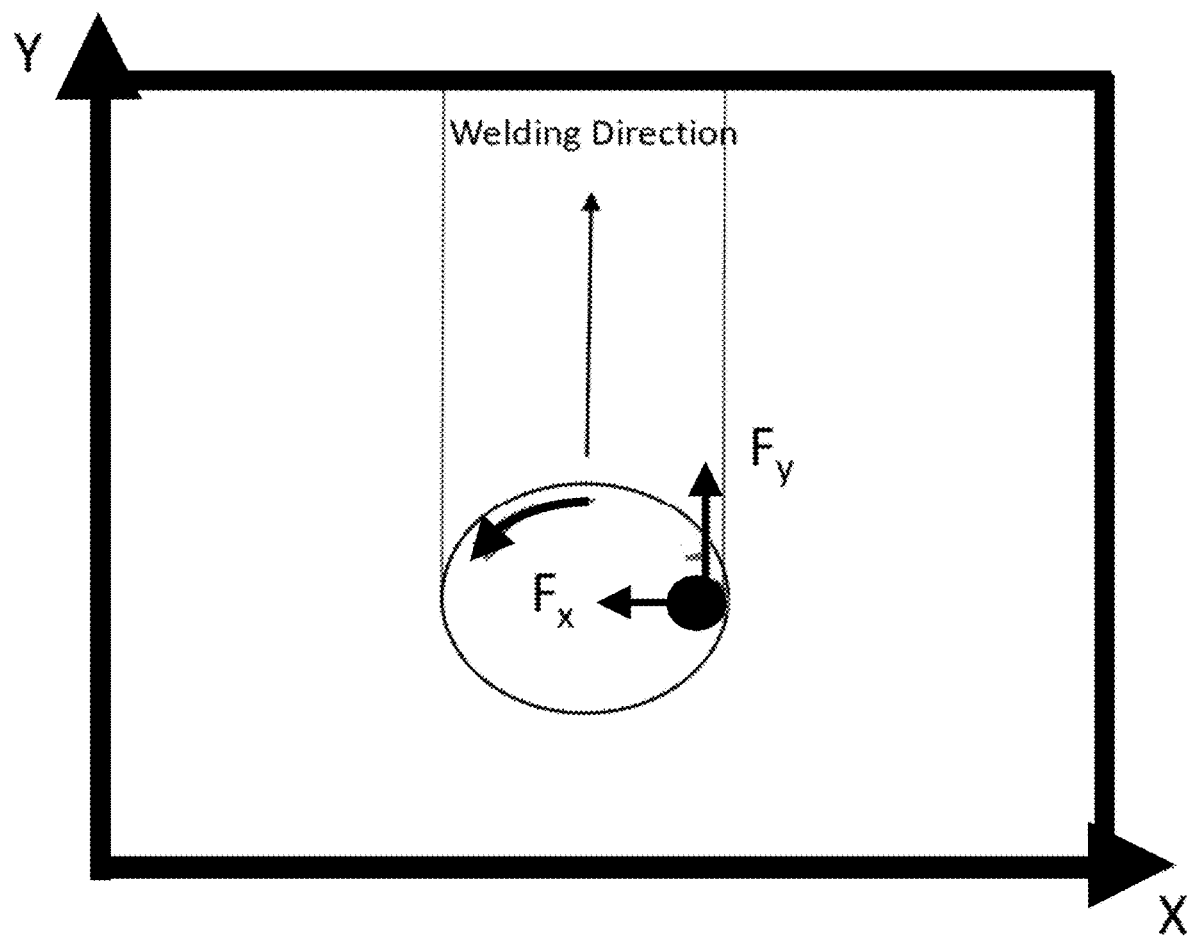
FIG. 8 is a graphical representation of a weld path showing force vectors.

FIG. 8 is a graphic representation of a weld path showing force vectors. $F_X$ is a radial vector and $F_y$ is a vector along the path of the weld direction. FIG. 8 shows that the weld is the same width as the diameter of the shoulder of the tool.

Figure 9A:
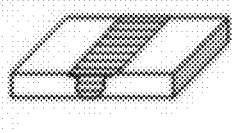
FIGS. 9A-9G are illustrations of a series of types of joints that can be joined using the invention.
Figure 9B:
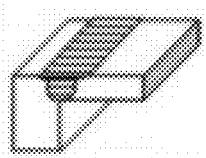
Figure 9C:
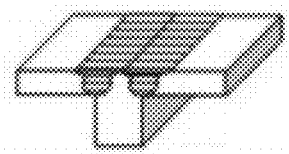
Figure 9D:
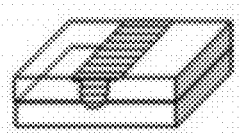
Figure 9E:
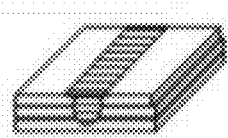
Figure 9F:
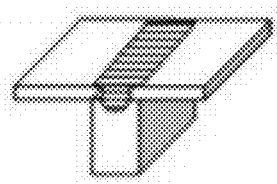
Figure 9G:
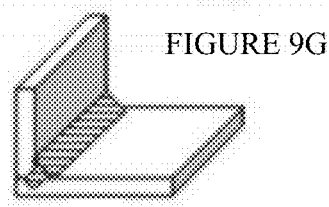

FIGS. 9A-9G illustrate a series of types of joints that can be joined using the invention. FIG. 9A is a square butt joint. FIG. 9B is an edge butt joint. FIG. 9C is a T-butt joint. FIG. 9D is a lap joint. FIG. 9E is a multiple lap joint. FIG. 9F is a T lap joint. FIG. 9G is a fillet joint. The tool and methods disclosed herein can be used to form any of the illustrated and listed weld types between dissimilar materials.

FIGS. 10A-10D illustrate a series of images showing a tool inserted into a softer material to access a harder material to form the molten weld composite, a close-up of a probe and scribe device, and a pair of cross-sectional representations of the structural details of a completed weld structure. Hook interconnections are shown extending from the hard material into the weld space, with the softer material providing in-fill to the hook feature and providing a dove-tail type of internal joint.

Figure 11:
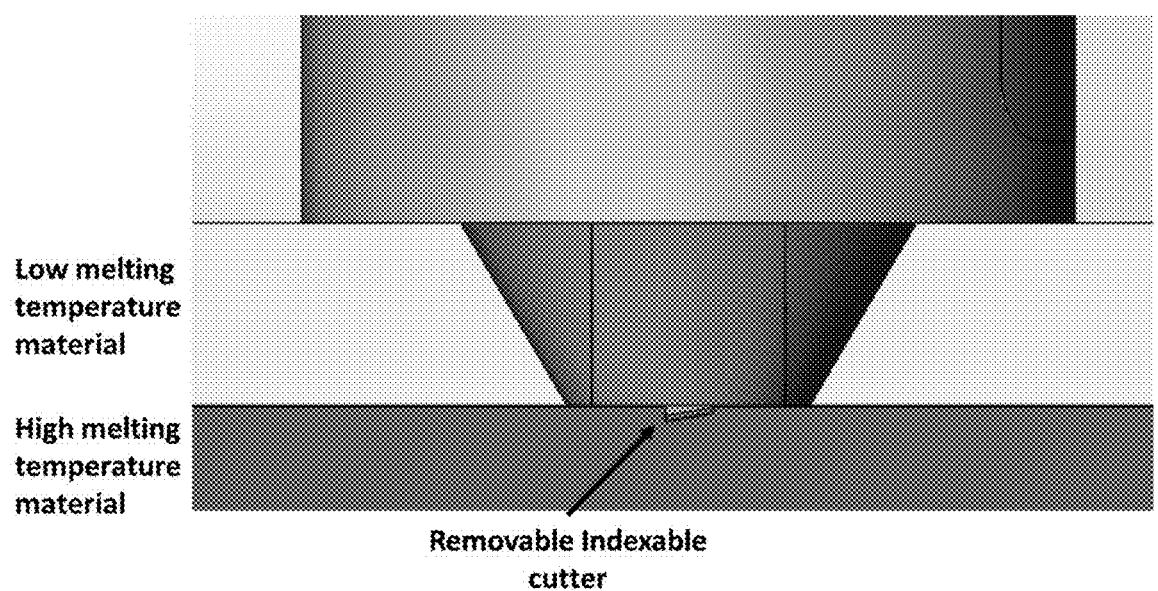
FIG. 11 is an illustration of a removable indexable cutter accessing a high melting temperature material through a low melting temperature material.

FIG. 11 is an illustration of a removable indexable cutter accessing a high melting temperature material through a low melting temperature material. As illustrated, the scribe can extend into the higher melting temperature material.

Figure 12:
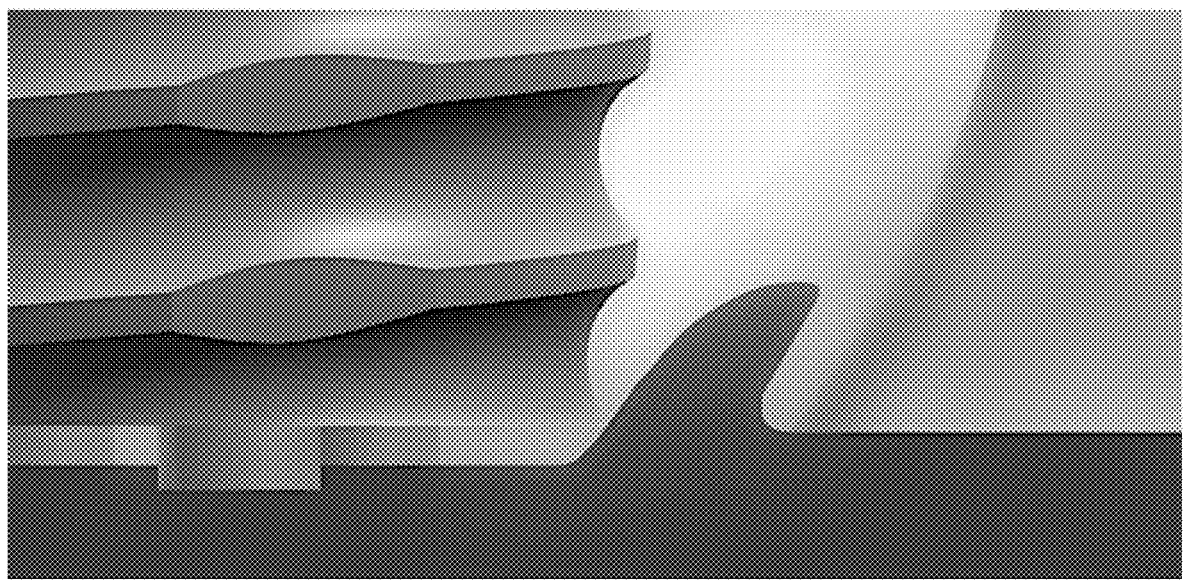
FIG. 12 is an illustration of a cross-sectional representation of the structural details of a weld structure during formation and shows a scribe attached to a fluted tool.

FIG. 12 is an illustration of a cross-sectional representation of the structural details of a weld structure during formation and shows a scribe attached to a fluted tool. Hook interconnections are shown extending from the hard material into the weld space, with the softer material providing in-fill to the hook feature and providing a filled-hook type of internal joint. In this figure the insert and scribe are shown extending from a sidewall of the probe and not perpendicularly away from the shoulder portion.

Figure 13:
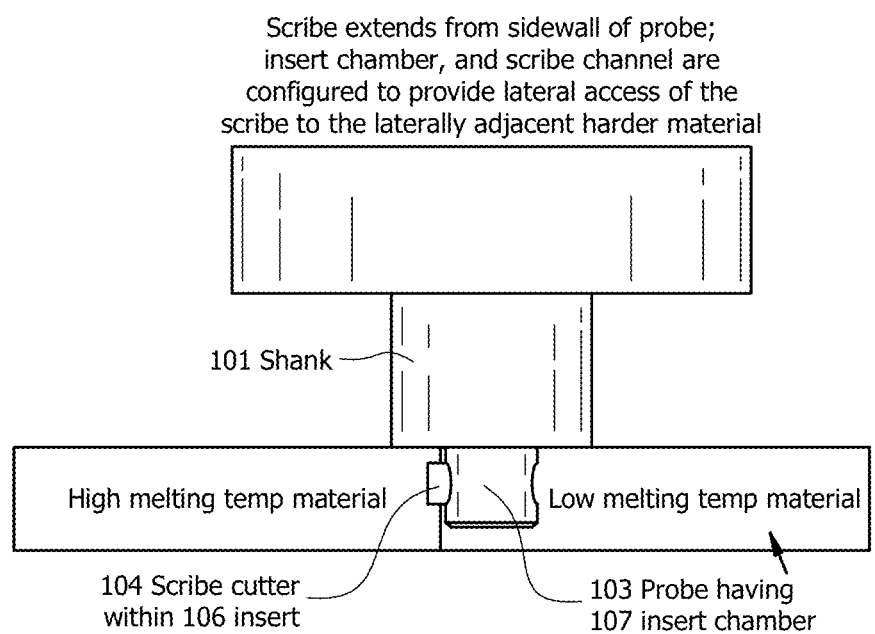
FIG. 13 is an illustration of a tool inserted into a softer material to access an adjacent harder material to form the molten weld composite at a butt joint.

FIG. 13 is an illustration of a tool inserted into a softer material to access an adjacent harder material to form the molten weld composite at a butt joint. Note that the scribe 104 extends from the sidewall of the probe 103. The insert 106, insert chamber 107, and scribe channel are configured to provide lateral access of the scribe 104 to the laterally adjacent harder material. Note that the shoulder 102 of the shank 101 is not the mounting point for the scribe 104. Similar to other embodiments, the indexable scribe cutter 104 can be mounted within the indexable cutting insert 106 in the tool body and the scribe extends through a channel 105 to contact the workpiece. Concave chamber portion 107 is used for seating the indexable cutting insert 106.

Figure 14:
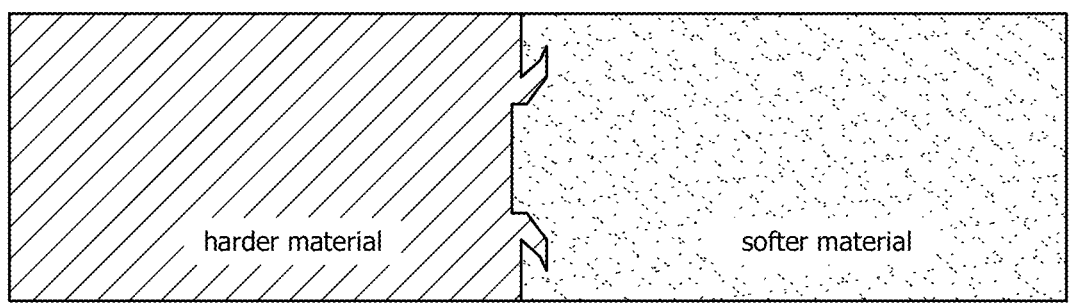
FIG. 14 is an illustration of a completed butt joint weld with a softer material joined/welded to an adjacent harder material using the weld composite hook structure at a butt joint.

FIG. 14 is an illustration of a completed butt joint weld with a softer material joined/welded to an adjacent harder material using the weld composite hook structure at a butt joint.

Figure 15:
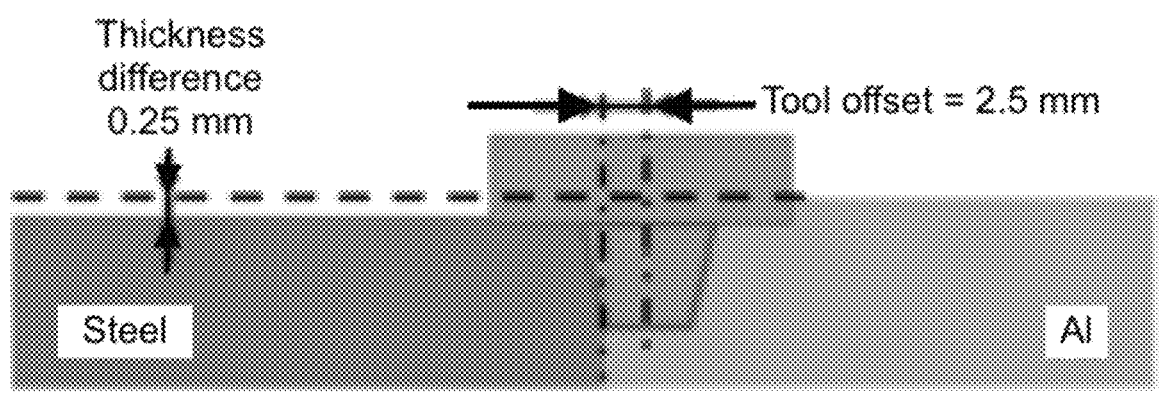
FIG. 15 is an illustration of offset and thickness variations available in a tool inserted into a softer material to access an adjacent harder material to form the molten weld composite at a butt joint.

FIG. 15 is an illustration of offset and thickness variations available in a tool inserted into a softer material to access an adjacent harder material to form the molten weld composite at a butt joint.

Figure 16:
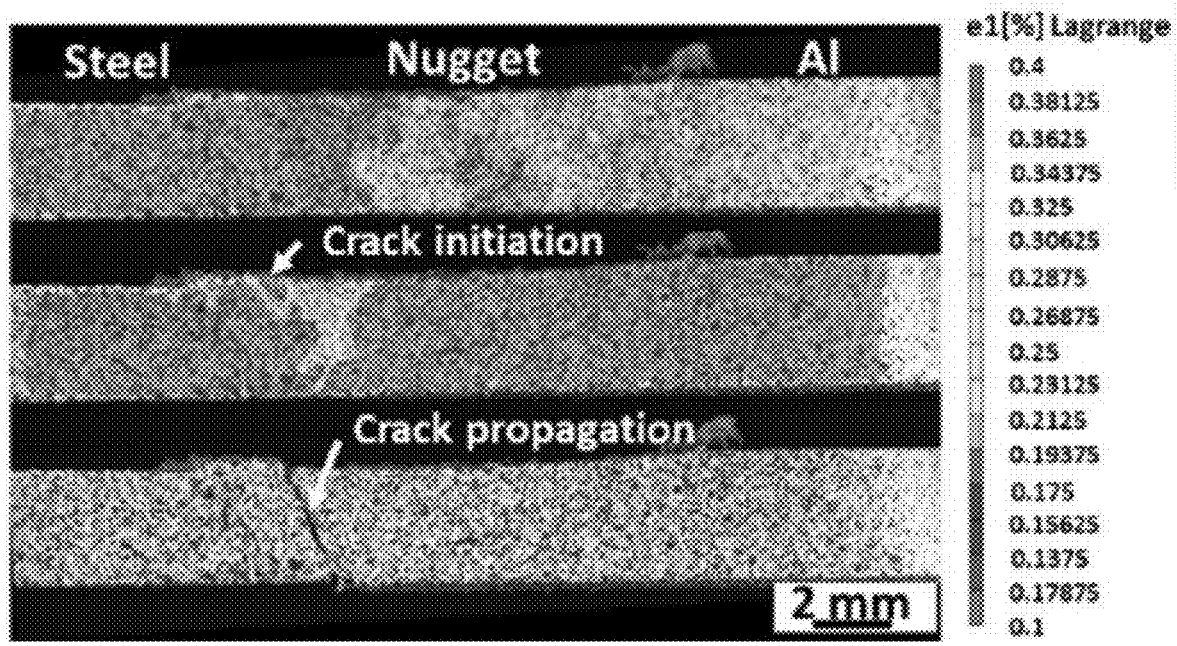
FIG. 16 is a three-part photographic representation of an ideal butt joint between Aluminum and Steel vs. a cracked joint in the lower two images.

FIG. 16 is a three-part photographic representation of an ideal butt joint between Aluminum and Steel vs. a cracked joint in the lower two images.

Figure 17:
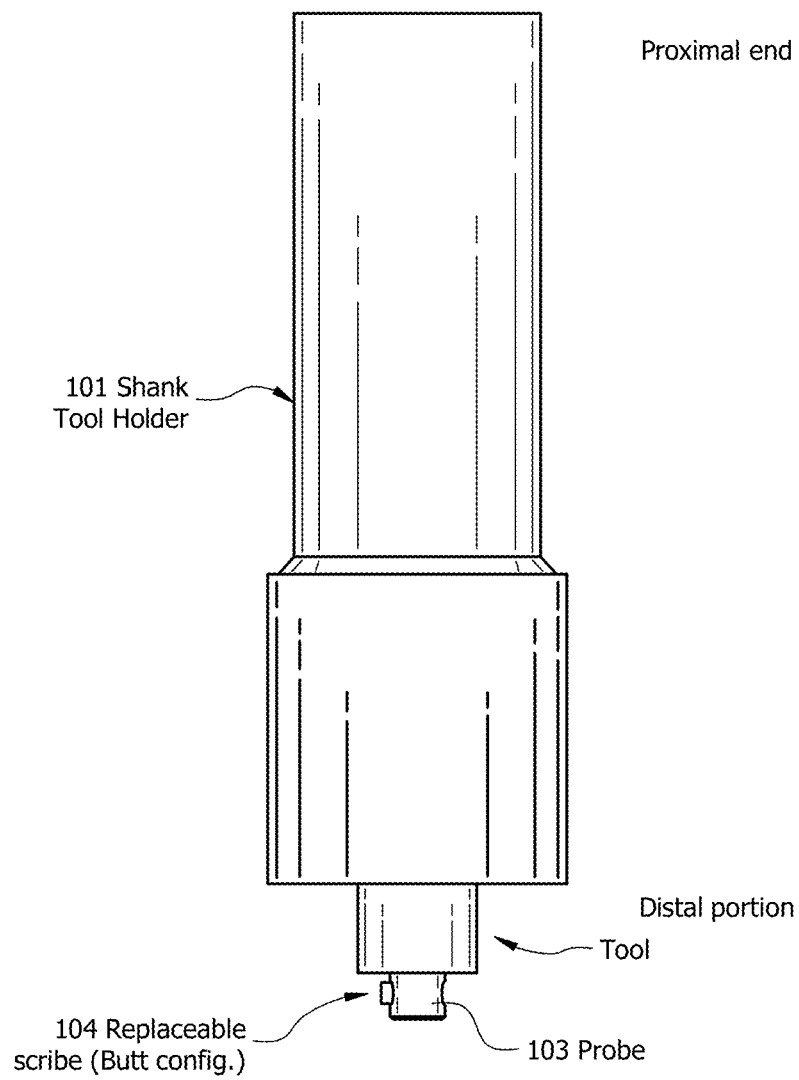
FIG. 17 is an assembled view of one embodiment of the invention and shows a friction stir welding probe having a tool body with an indexable, replaceable scribe cutting insert mounted in the tool body.

FIG. 17 is an assembled view of one embodiment of the invention and shows a friction stir welding probe having a tool body with an indexable, replaceable scribe cutting insert mounted in the tool body. Note again that the scribe 104 extends from the sidewall of the probe 103. The insert 106, insert chamber 107, and scribe channel are configured to provide lateral access of the scribe 104 to the laterally adjacent harder material. Note that the shoulder 102 of the shank 101 is not the mounting point for the scribe 104. Similar to other embodiments, the indexable scribe cutter 104 is mounted within the indexable cutting insert 106 in the tool body and the scribe extends through a channel 105 to contact the workpiece. Concave chamber portion 107 is used for seating the indexable cutting insert 106.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

In one non-limiting preferred embodiment, a removable scribe tool can have a Tool Configuration as follows.
Specifications
Tool Body: Material: H13 Tool Steel
Mechanical Clamping Insert: Material H13 Tool Steel
M2×0.4 mm Fasteners: Grade 2 Steel, Black Oxide Steel (91290A019)
Indexable Cutter Information: Substrate: Super-Micrograin Cermet Coating Material: TiAlN+TiN
Hardness: 14.7 GPa
Fracture Toughness 10 MPam½ Flexural Toughness: 2500 MPa

Example 2

In one non-limiting embodiment, a method is disclosed for performing welding in both lap (a) and butt (d) configurations, which are common in large manufacturing industries such as aerospace, transportation, energy, and defense. The use of friction stir welding has been shown to be an efficient and industrially feasible process.

Example 3

In one non-limiting embodiment, a friction stir scribe technique is provided that allows for joining of two dissimilar metals by in-process formation of interlocking hooks during welding. In this example, a cermet scribe cutter is attached to the tool and plunged into the higher melting point material to abrade the surface and form hooks. In parallel, the lower melting point material flows around during this process and fills the abraded areas enabling an efficient process of bonding two dissimilar metals.

Example 4

In one non-limiting embodiment, a method is provided where hooks created during welding by the scribes during welding lead to increased strength by interlocking the two metals together, similar to a rivet.

Example 5—Butt Welds

In one non-limiting embodiment, a method is provided wherein the butt joint configuration is to offset the tool from the centerline. The offset changes the interface profile and bonding of aluminum to steel. Defects are formed due to inadequate material flow. Improvement of the material flow can reduce the formation of void-related stress concentrations and improve mechanical properties of dissimilar butt welds. The removable friction stir scribe tool (e.g., in the butt configuration) was designed to:

1. Introduce a similar interface modifying feature to the traditional FSW tool in the lap welding configuration.
2. Enable dissimilar butt welding to benefit from the strengthening inherent to the currently described friction stir scribe technique (shown in lap welding) by producing a mechanical interlocking feature in butt joint configuration.
3. Assist with material flow to the abraded region and promote radial flow of the low melting temperature around the tool during welding.

Having described various systems and methods herein, certain aspects can include, but are not limited to:

In a first aspect, a method for forming a weld between at least two dissimilar materials using a friction stir welding tool, the method comprising the steps of: providing the friction stir welding tool comprising an elongated cylindrical shank, a shoulder portion disposed at a distal end of the shank, a pin/probe extending from the shoulder, an indexable cutting insert mounted within a concave portion at the distal end of the cylindrical shank, said indexable cutting insert extends distally through a channel in the pin/probe, and an indexable scribe cutter mounted at a distal end of the indexable cutting insert and extending from a terminal end surface of the pin/probe in an offset position wherein the terminal end surface of the pin/probe is perpendicular to the longitudinal direction of the tool; positioning the dissimilar materials comprising a first material and a second material in a weld stack with an overlap therebetween defining a weld interface of the materials being joined; rotating the friction stir welding tool and penetrating the first material of the weld stack to a preselected depth with the pin and the indexable scribe cutter, the pin and indexable scribe cutter penetrating into the first material and the indexable scribe cutter penetrating the second material; wherein the indexable scribe cutter cuts a surface of the second material to introduce a plurality of features therein along the weld interface; and backfilling the features with extruded first material forming mechanically interlocking features along the weld interface that yields a weld with an enhanced shear strength between the dissimilar materials.

A second aspect can include the method of the first aspect, wherein the first material is a metal selected from aluminum, magnesium, or alloys thereof.

A third aspect can include the method of the first or second aspect, wherein the second material is of a greater melting temperature than the first material.

A fourth aspect can include the method of any one of the first to third aspects, wherein the second material is steel, titanium, or alloys thereof.

A fifth aspect can include the method of the first aspect, wherein the first material is a metal/alloy or is a polymer and the second material is metal/alloy.

A sixth aspect can include the method of the first aspect, wherein the first material is a metal/alloy or is a polymer and the second material is steel or steel alloy.

A seventh aspect can include the method of any one of the first to sixth aspects, wherein the first material and second material have a melting temperature that is different from the other by at least about 20%.

An eighth aspect can include the method of any one of the first to seventh aspects, wherein the first material and second material have a density that is different from the other by at least about 10%.

A ninth aspect can include the method of any one of the first to eighth aspects, wherein the shank, pin/probe and indexable cutting insert consist of both alloys and cermet materials.

A tenth aspect can include the method of any one of the first to ninth aspects, wherein the shank, pin/probe and indexable cutting insert consist of H13 tool steel.

An eleventh aspect can include the method of any one of the first to tenth aspects, wherein the indexable cutting insert is mounted to the mechanical insert or the tool body using mechanical fasteners.

A twelfth aspect can include the method of any one of the first to eleventh aspects, wherein the indexable cutting insert is mounted to the mechanical insert or the tool body using mechanical fasteners made from grade 2 steel or black oxide steel.

A thirteenth aspect can include the method of any one of the first to twelfth aspects, wherein the indexable scribe cutter is made from super micro-grain cermet with a TiAlN+TiN coating material.

A fourteenth aspect can include the method of any one of the first to twelfth aspects, wherein the indexable scribe cutter is made from a material selected from the group consisting of: tungsten carbide, nickel, titanium, tungsten, steel, carbide steel, polycrystalline cubic boron nitride, polycrystalline diamond, silicon nitride, rhenium, boron, and combinations thereof.

A fifteenth aspect can include the method of any one of the first to fourteenth aspects, wherein the indexable scribe cutter extends a distance below the surface of the pin selected a distance less than 50% of the first material's thickness.

A sixteenth aspect can include the method of any one of the first to fifteenth aspects, wherein the indexable scribe cutter extends a distance below the surface of the pin selected in the range from about 0.1 mm to about 3.0 mm.

A seventeenth aspect can include the method of any one of the first to sixteenth aspects, wherein the indexable scribe cutter includes a radial offset position that is a distance of at least about one quarter of the diameter of the base of the pin measured from the center of the pin.

An eighteenth aspect can include the method of any one of the first to seventeenth aspects, wherein the indexable scribe cutter generates a weld interface of a width that is at least about two times the offset distance of the scribe cutter.

A nineteenth aspect can include the method of any one of the first to eighteenth aspects, wherein the indexable scribe cutter in operation has a rotational velocity of between about 100 rpm and 3000 rpm.

A twentieth aspect can include the method of any one of the first to nineteenth aspects, wherein the indexable scribe cutter includes a taper angle greater than or equal to about 90 degrees.

A twenty first aspect can include the method of any one of the first to twentieth aspects, wherein the indexable scribe cutter is angled at between 0 and 90 degrees with respect to the vertical direction.

In a twenty second aspect, a friction stir welding tool comprises: an elongated cylindrical shank, a shoulder portion disposed at a distal end of the shank, a pin/probe extending from the shoulder, an indexable cutting insert is mounted within a concave portion at the distal end of the cylindrical shank, said indexable cutting insert extends distally through a channel in the pin/probe, and an indexable scribe cutter mounted at a distal end of the indexable cutting insert and extending from a terminal end surface of the pin/probe in an offset position, wherein the terminal end surface of the pin/probe is perpendicular to the longitudinal direction of the tool.

A twenty third embodiment can include the friction stir welding tool of the twenty second aspect, wherein the shank, pin/probe and indexable cutting insert consist of H13 tool steel.

A twenty fourth embodiment can include the friction stir welding tool of the twenty second or twenty third aspect, wherein the indexable scribe cutter is made from a material selected from the group consisting of: tungsten carbide, nickel, titanium, tungsten, steel, carbide steel, polycrystalline cubic boron nitride, polycrystalline diamond, silicon nitride, rhenium, boron, and combinations thereof.

A twenty fifth embodiment can include the friction stir welding tool of any one of the twenty second to twenty fourth aspects, wherein the indexable scribe cutter extends a distance below the surface of the pin selected a distance less than 50% of the first material's thickness.

A twenty sixth embodiment can include the friction stir welding tool of any one of the twenty second to twenty fifth aspects, wherein the indexable scribe cutter extends a distance below the surface of the pin selected in the range from about 0.1 mm to about 3.0 mm.

A twenty seventh embodiment can include the friction stir welding tool of any one of the twenty second to twenty sixth aspects, wherein the indexable scribe cutter includes a radial offset position that is a distance of at least about one quarter of the diameter of the base of the pin measured from the center of the pin.

A twenty eighth embodiment can include the friction stir welding tool of any one of the twenty second to twenty eighth aspects, wherein the indexable inserts are mechanically fixed to the tool body or mechanical insert, in the pin, the shoulder or between the two.

A twenty ninth embodiment can include the friction stir welding tool of any one of the twenty second to twenty eighth aspects, wherein the indexable scribe cutter has various cutting geometries designed to shear workpiece material, the shape selected from the group consisting of: an inverted cone, an inverted cuboid, a cylinder, an inverted squared pyramid, an inverted triangular pyramid, an inverted triangular prism, an inverted diamond, and an irregular polyhedron.

A thirtieth embodiment can include the friction stir welding tool of any one of the twenty second to twenty ninth aspects, wherein the indexable cutting insert is configured to mount two or more indexable scribe cutters, with cutting edges of the two or more indexable scribe cutters contacting the intended workpiece material.

A thirty first embodiment can include the friction stir welding tool of any one of the twenty second to thirtieth aspects, wherein the indexable scribe cutter is brazed, mechanically fastened, or attached to the indexable cutting insert.

Embodiments are discussed herein with reference to the Figures. However, those skilled in the art will readily appreciate that the detailed description given herein with respect to these figures is for explanatory purposes as the systems and methods extend beyond these limited embodiments. For example, it should be appreciated that those skilled in the art will, in light of the teachings of the present description, recognize a multiplicity of alternate and suitable approaches, depending upon the needs of the particular application, to implement the functionality of any given detail described herein, beyond the particular implementation choices in the following embodiments described and shown. That is, there are numerous modifications and variations that are too numerous to be listed but that all fit within the scope of the present description. Also, singular words should be read as plural and vice versa and masculine as feminine and vice versa, where appropriate, and alternative embodiments do not necessarily imply that the two are mutually exclusive.

It is to be further understood that the present description is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present systems and methods. It must be noted that as used herein and in the appended claims (in this application, or any derived applications thereof), the singular forms "a," "an," and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this description belongs. Preferred methods, techniques, devices, and materials are described, although any methods, techniques, devices, or materials similar or equivalent to those described herein may be used in the practice or testing of the present systems and methods. Structures described herein are to be understood also to refer to functional equivalents of such structures. The present systems and methods will now be described in detail with reference to embodiments thereof as illustrated in the accompanying drawings.

From reading the present disclosure, other variations and modifications will be apparent to persons skilled in the art.

Such variations and modifications may involve equivalent and other features which are already known in the art, and which may be used instead of or in addition to features already described herein.

Although Claims may be formulated in this Application or of any further Application derived therefrom, to particular combinations of features, it should be understood that the scope of the disclosure also includes any novel feature or any novel combination of features disclosed herein either explicitly or implicitly or any generalization thereof, whether or not it relates to the same systems or methods as presently claimed in any Claim and whether or not it mitigates any or all of the same technical problems as do the present systems and methods.

Features which are described in the context of separate embodiments may also be provided in combination in a single embodiment. Conversely, various features which are, for brevity, described in the context of a single embodiment, may also be provided separately or in any suitable sub-combination. The Applicants hereby give notice that new claims may be formulated to such features and/or combinations of such features during the prosecution of the present Application or of any further Application derived therefrom.

What is claimed is:

1. A method for forming a weld between at least two dissimilar materials using a friction stir welding tool, the method comprising:
   providing the friction stir welding tool comprising a cylindrical shank, a shoulder portion disposed at a distal end of the shank, a pin extending from the shoulder, a cutting insert mounted within a concave portion at the distal end of the shank, wherein the cutting insert extends distally through a channel in the pin/probe, and a scribe cutter mounted at a distal end of the cutting insert and extending from a terminal end surface of the pin in an offset position, and wherein the terminal end surface of the pin is perpendicular to a longitudinal axis of the shank;
   positioning at least two dissimilar materials in a weld stack with an overlap therebetween, wherein the at least two dissimilar materials comprise a first material and a second material, and wherein the overlap defines a weld interface of the at least two dissimilar materials being joined;
   rotating the friction stir welding tool;
   penetrating the first material of the weld stack to a preselected depth with the pin and the scribe cutter, wherein the pin and the scribe cutter penetrating into the first material and the scribe cutter penetrate the second material;
   cutting, with the scribe cutter, a surface of the second material to introduce a plurality of features therein along the weld interface;
   backfilling the plurality of features with extruded first material; and
   forming mechanically interlocking features along the weld interface to form a weld between the dissimilar materials.

2. The method of claim 1, wherein the second material has a higher melting temperature than a melting temperature of the first material.

3. The method of claim 1, wherein the first material and second material have melting temperatures that are different from each other by at least about 20% on an absolute temperature basis.

4. The method of claim 1, wherein the first material and second material have densities that is different from each other by at least about 10%.

5. The method of claim 1, wherein the scribe cutter is mounted to the cutting insert or the shank using mechanical fasteners.

6. The method of claim 1, wherein the scribe cutter is made from a material selected from the group consisting of: tungsten carbide, nickel, titanium, tungsten, steel, carbide steel, polycrystalline cubic boron nitride, polycrystalline diamond, silicon nitride, rhenium, boron, and combinations thereof.

7. The method of claim 1, wherein the scribe cutter extends a below the surface of the pin to a distance of equal to or less than 50% of the distance the pin extends from the shoulder.

8. The method of claim 1, wherein the scribe cutter extends a distance from the surface of the pin in the range from about 0.1 mm to about 3.0 mm.

9. The method of claim 1, wherein the scribe cutter includes a radial offset position from a center of the pin that is a distance of at least about one quarter of the radius of a base of the pin as measured from the center of the pin.

10. The method of claim 1, wherein the scribe cutter rotates with a rotational velocity of between about 100 rpm and 3000 rpm.

11. The method of claim 1, wherein the scribe cutter is angled at between 0 and 90 degrees with respect to a longitudinal axis of the shank.

12. A friction stir welding tool comprising:
a cylindrical shank,
a shoulder portion disposed at a distal end of the shank,
a pin extending from the shoulder,
a cutting insert mounted within a concave portion at the distal end of the shank, wherein the cutting insert extends distally through a channel in the pin, and
a scribe cutter mounted at a distal end of the cutting insert, wherein the scribe cutter extends from a distal end surface of the pin in an offset position, wherein the distal end surface of the pin is perpendicular to a longitudinal axis of the shank.

13. The friction stir welding tool of claim 12, wherein the shank, the pin, and the cutting insert comprise of H13 tool steel.

14. The friction stir welding tool of claim 12, wherein the scribe cutter is made from a material selected from the group consisting of: tungsten carbide, nickel, titanium, tungsten, steel, carbide steel, polycrystalline cubic boron nitride, polycrystalline diamond, silicon nitride, rhenium, boron, and combinations thereof.

15. The friction stir welding tool of claim 12, wherein the scribe cutter extends a distance below the distal end surface of the pin a distance of equal to or less than 50% of the distance the pin extends from the shoulder.

16. The friction stir welding tool of claim 12, wherein the scribe cutter extends a distance below the distal end surface of the pin a distance in the range of from about 0.1 mm to about 3.0 mm.

17. The friction stir welding tool of claim 12, wherein the scribe cutter includes a radial offset position from a center of the pin that is a distance of at least about one quarter of the radius of a base of the pin as measured from the center of the pin.

18. The friction stir welding tool of claim 12, wherein the scribe cutter has a cutting geometry configured to shear a workpiece material, wherein a shape of the cutting geometry is selected from the group consisting of: an inverted cone, an inverted cuboid, a cylinder, an inverted squared pyramid, an inverted triangular pyramid, an inverted triangular prism, an inverted diamond, and an irregular polyhedron.

19. The friction stir welding tool of claim 12, wherein the cutting insert is configured to mount two or more scribe cutters, wherein cutting edges of the two or more indexable scribe cutters are configured to contact a workpiece material.

20. The friction stir welding tool of claim 12, wherein the scribe cutter is brazed, mechanically fastened, or attached to the cutting insert.

* * * * *